United States Patent [19]

Hirano

[11] 4,090,179
[45] May 16, 1978

[54] SYSTEM FOR MONITORING FLOW RATE DIFFERENCE IN WATER COOLING CONDUIT

[75] Inventor: Toru Hirano, Yokohama, Japan

[73] Assignee: Hokushin Electric Works, Ltd., Tokyo, Japan

[21] Appl. No.: 761,241

[22] Filed: Jan. 21, 1977

[30] Foreign Application Priority Data

Jan. 29, 1976  Japan .................................. 51-8914

[51] Int. Cl.² ............................................. G08B 21/00
[52] U.S. Cl. ................................ 340/242; 73/40.5 R; 73/194 VS; 73/196
[58] Field of Search ................... 340/242, 239 R, 243; 235/92 FL; 73/194 VS, 196, 40.5

[56] References Cited

U.S. PATENT DOCUMENTS 3,723,987  3/1973  Barone, Jr. et al. ......... 340/248 A X
3,909,596  9/1975  Sullivan ...................... 235/92 FL X
3,978,462  8/1976  Goodman ........................... 340/243

Primary Examiner—John W. Caldwell, Sr.
Assistant Examiner—Daniel Myer
Attorney, Agent, or Firm—Michael Ebert

[57] ABSTRACT

A system for monitoring the frequency difference between pulse output signals derived from a pair of flowmeters interposed, respectively, in the inlet and outlet lines of a flow conduit supplying cooling water to the tuyere of a blast furnace, the frequency difference being indicative of water leakage. The pulse output signals produced by the respective flowmeters during each predetermined measuring period are integrated. The integrated values are compared with each other, the difference therebetween being monitored whereby when the difference exceeds a predetermined set value, an alarm is generated.

5 Claims, 6 Drawing Figures

SYSTEM FOR MONITORING FLOW RATE DIFFERENCE IN WATER COOLING CONDUIT

BACKGROUND OF INVENTION

This invention relates generally to the monitoring of a water flow conduit to detect water leakage, and more particularly to a monitoring system in which like flowmeters, each generating a pulse signal whose frequency depends on flow rate, are respectively interposed in the inlet and outlet lines of the conduit to produce output signals which are compared to determine whether a frequency difference exists therebetween indicative of leakage.

Iron ore is reduced to pig iron in a blast furnace. Circumferentially disposed near the top of the hearth section of the furnace are a plurality of tuyeres which function to admit gas or air therein for combustion, each tuyere being cooled by water passing through a flow conduit. It is important to detect water leakage from the conduit; for should leakage occur, the quality of iron produced by the furnace will be degraded. Moreover, with heavy water leakage, there is danger of explosion. Monitoring of the cooling water is therefore essential.

Since iron ore is thrown into the blast furnace equipped with tuyeres, these tuyeres may be damaged thereby, causing leaks in the water cooling conduits. It is therefore of the utmost importance, in order to prevent degradation of the quality of the product or to avoid the danger of explosion, that water leakages be detected in their early stages.

To carry out such monitoring it is known to use a pair of vortex-shedding or Karman-type flowmeters, one being interposed in the inlet line to the cooling conduit, and the other in the outlet line therefrom. A vortex flowmeter includes an obstacle in the flow path which generates fluidic oscillations as a function of flow rate, these oscillations being sensed to produce a pulse signal whose frequency is proportional to flow rate. The pulse output signals from the pair of flowmeters are applied to a comparator which yields an analog output signal that depends on the difference in frequency between the applied signals. When the frequency difference is zero, this indicates the absence of a leak, but when a difference is detected, this signifies that a leak exists.

In a conventional monitoring arrangement, the pulse output signals from the inlet and outlet flowmeters are converted into analog current signals proportional to the pulse frequency by means of frequency-to-current converters, this analog signal being applied to a difference circuit which yields an analog output signal that depends on the difference between the applied analog current signals. This analog output signal is compared in a comparator with a reference voltage, such that when the analog signal which represents the difference between inlet and outlet flows exceeds the reference voltage, an alarm signal is produced to call attention to the existence of a water leak.

In the typical blast furnace installation, there are usually 20 to 40 tuyeres. Hence to monitor water leakage in the flow conduit associated with the large number of tuyeres, 40 to 80 flowmeters are required, two for each conduit. Preferably these flowmeters are of the Karman-vortex type in which an obstacle in the flow tube causes fluidic oscillations to be produced which are sensed by probes to produce an output pulse signal whose frequency is proportional to flow rate. Such meters have several significant advantages among which are low cost and excellent repeatability.

When however, the cooling water contains contaminants such as rubbish or pieces of thread which adhere to the probes of the Karman-vortex flowmeters, a problem arises, for these contaminants will inevitably not adhere in the same way to the probes of both the inlet and outlet flowmeters. Thus one probe may be more contaminated than the other, as a consequence of which flow rate differences will appear in the measured outputs of these flowmeters. The difference signal resulting from such uneven contamination cannot be distinguished or discriminated from the difference signal caused by water leakage.

Thus in a conventional monitoring system in which the instantaneous flow rates in the inlet and outlet lines are compared to produce an alarm signal, false alarms will be produced as a result of contaminants which adhere to the probes of the flowmeters.

Also in the conventional monitoring system which requires frequency-to-current converters, the flow rate difference derived from these current signals includes fluctuations arising from conversion errors or ripple components in the current signals. In this instance since there is a lower limit in the alarm level setting, a false alarm will be produced when the setting level is made lower than the limit level.

SUMMARY OF INVENTION

In view of the foregoing, it is the main object of this invention to provide a system for monitoring flow rate differences to detect the existence of a leak in a fluid conduit and to generate an alarm signal, which system is not subject to false alarms as a result of contaminants in the flow line.

More particularly, it is an object of this invention to provide a system making use of vortex-shedding flowmeters having sensor probes to which foreign substances in the flow line tend to adhere, the monitoring system discriminating between a difference signal resulting from such contamination and a difference signal produced by the existence of a leak in the flow conduit in which the flowmeters are installed.

Briefly stated, these objects are attained in a system in which the pulse signal outputs of the inlet and outlet flowmeters interposed in the flow conduit which are developed periodically during a predetermined interval are integrated to produce integrated values. These integrated values are compared with each other to produce an integrated value difference signal which is monitored to detect the existence of leaks.

OUTLINE OF DRAWING

For a better understanding of the invention as well as other objects and further features thereof, reference is made to the following detailed description to be read in conjunction with the accompanying drawings, wherein:

FIG. 3 is a block diagram showing a preferred embodiment of a monitoring system in accordance with the invention.

DESCRIPTION OF INVENTION

1. Prior Art

Figure 1:
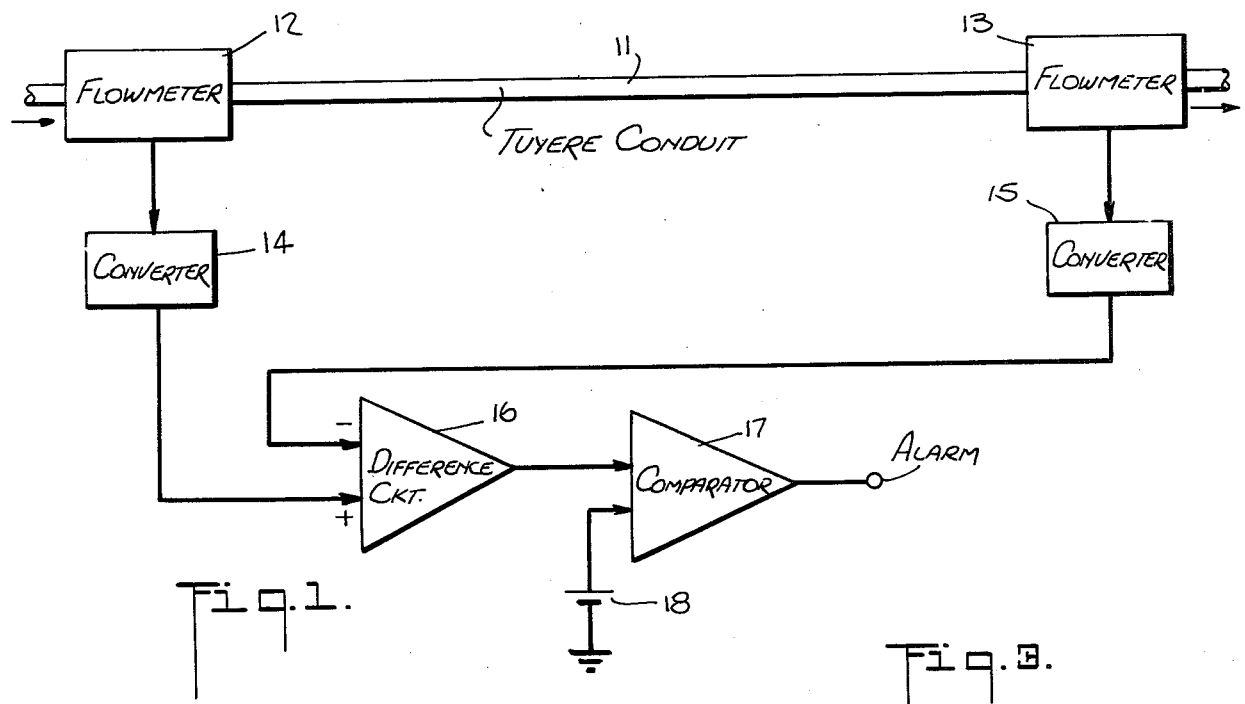
FIG. 1 is a block diagram showing a prior art system for monitoring flow rate differences.

Referring now to FIG. 1, a conventional monitoring system is shown in which water is conducted through a conduit 11 to refrigerate a tuyere, the flow rate of water into the tuyere being measured by an inlet flowmeter 12 and the flow rate of water from the tuyere being measured by an outlet flowmeter 13. These flowmeters are of the Karman-vortex type and produce pulse output signals which are converted by frequency-to-current converters 14 and 15 into analog current signals proportional to the pulse frequency and hence to the flow rate.

The current signals from converters 14 and 15 are applied to the input of a difference circuit 16 which yields an analog difference signal that depends on the difference between the applied input signals. The difference signal from circuit 16 is fed to a comparator 17 where it is compared with a reference voltage supplied by a D-C source 18. When a difference signal is developed as a result of a leak or any other cause, and this difference signal exceeds the reference voltage, an alarm output is developed by comparator 17.

As pointed out previously, when the probes of the Karman-vortex meters are unequally fouled by contaminants, the difference signal resulting from a comparison of instantaneous flow rates reflects this condition and cannot be distinguished from the difference signal reflecting water leakage in the conduit. Consequently, a false alarm will be produced. Also, fluctuations caused by conversion errors in converters 14 and 15 or ripple components in the current signals produced by the converters may also cause false alarms.

2. The Invention

In a system in accordance with the invention, the output pulse signals from inlet and outlet flowmeters 12 and 13 in the conduit 11 are respectively integrated during each measuring period of predetermined duration and the flow rate difference is determined from these integrated values. The same result may also be obtained by integrating the difference between detected pulse signals from the flowmeter.

Generally, when foreign substances adhere to flowmeter 12 in the inlet line, the flow rate difference rises in the positive (+) direction and when these foreign substances adhere to flowmeter 13 in the outlet line, the flow rate difference falls in the negative (−) direction, as indicated in FIGS. 2A to 2D. However, these relationships may be reversed because of the place on the probe to which the contaminants adhere.

Figure 2:
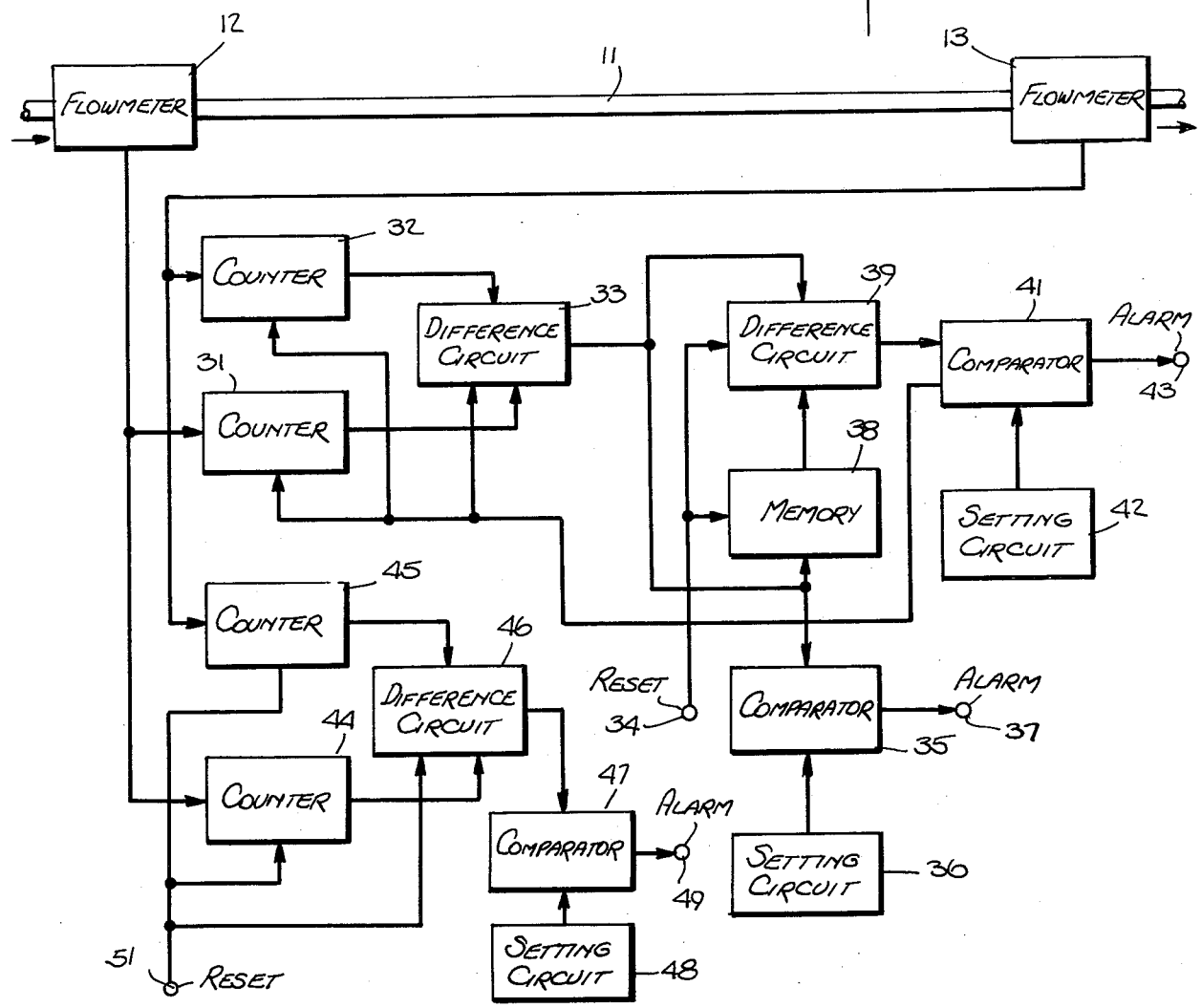
FIGS. 2A to 2D are wave forms illustrating various curves obtained by comparing instantaneous pulse output signals derived from the inlet and outlet flowmeters in the monitoring system.
Figure 2A:
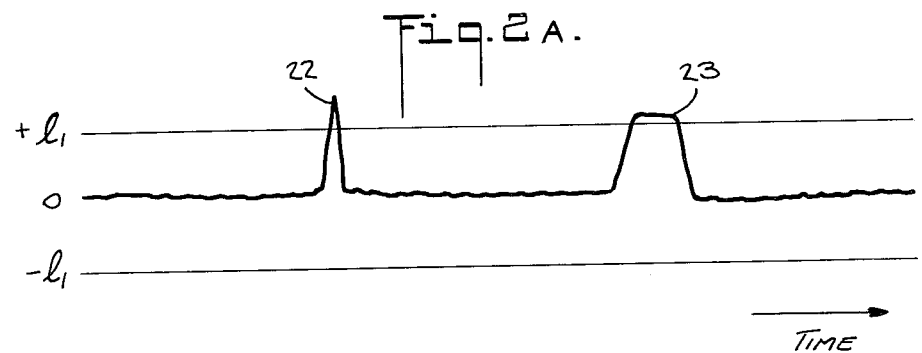

In FIG. 2A, there is shown the flow rate difference which occurs when foreign substances adhere to the probes of the flowmeters for a brief interval. It will be seen that the flow rate difference becomes momentarily larger at portions 22 and 23 in the wave form. When the foreign substances adhere to the flowmeter probes for a relatively long time, the increased flow rate difference remains large for the entire interval in which these substances adhere to the probes, as indicated at portion 24 in the wave form shown in FIG. 2B.

Figure 2B:
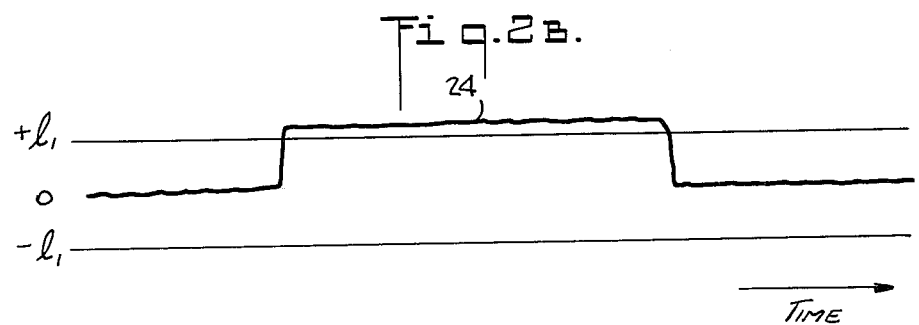
Figure 2C:
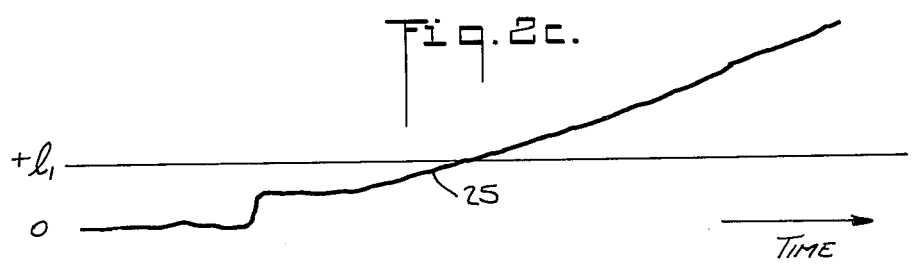

FIG. 2C graphically illustrates the flow rate difference when conduit 11 is damaged and springs a leak. When the break in the conduit caused by this damage gradually becomes larger, the flow rate difference rises gradually, as shown by curve 25.

Figure 2D:
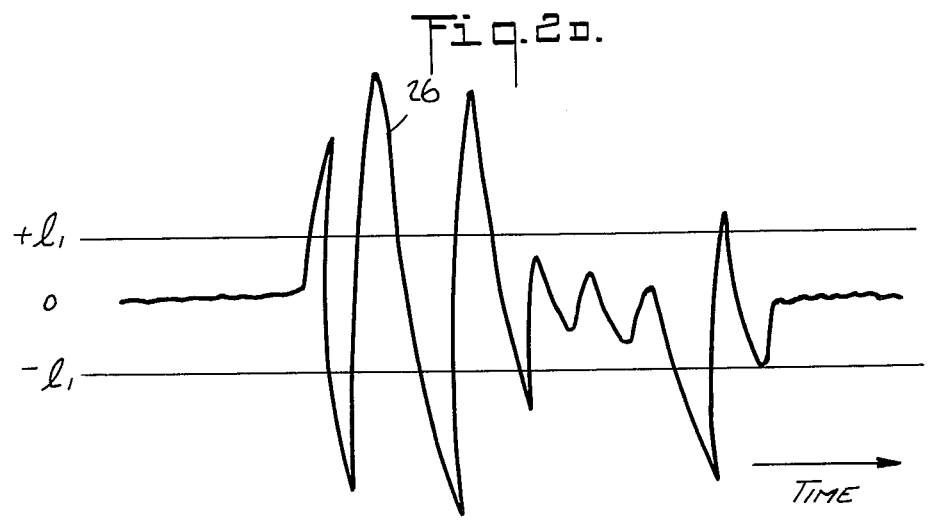

Furthermore, when damage to the conduit results in a large hole, causing cooling water to rush into the interior of the furnace and possibly at the same time causing gas in the furnace to flow reversely into the cooling water conduit, the flow rate will then fluctuate sharply, thereby generating the complicated wave zigzag pattern illustrated in FIG. 2D.

Referring now to FIG. 3, which shows a preferred embodiment of the monitoring system according to the invention, the pulse output signals from inlet and outlet flowmeters 12 and 13 are applied to counters 31 and 32, respectively, or equivalent means serving as integrators for these pulse signals. The integrated values from counters 31 and 32 are applied to a difference circuit 33 to obtain the difference therebetween. The difference circuit 33, as well as counters 31 and 32 are reset by a reset pulse periodically applied to terminal 34 at predetermined intervals, which may last several minutes, such as every 10 minutes.

The integral value difference signal from difference circuit 33 is applied to one input terminal of a comparator 35 which compares this signal with a set value applied to the other input terminal by a setting circuit 36. When the integrated value difference signal exceeds this set value, comparator 35 yields at output terminal 37 an alarm signal.

In this arrangement, even though a difference signal obtained by directly comparing the measured output pulse signals from flowmeters 12 and 13 momentarily exceeds a first order alarm set level $+1_1$ or $-1_1$, as shown in FIG. 2A, a false alarm can be prevented, for the integrated value difference signal obtained by comparing integrated values does not exceed the set of setting circuit 36. In this instance, the point at which an alarm is set off may be adjusted by changing the integral time; that is, the duration of the intervals at which the reset signal is applied at reset terminal 34, rather than by varying the set value of setting circuit 36.

When, however, foreign substances adhere to the probes of the flowmeters for a relatively extended period, as illustrated in FIG. 2B, and when the portion 24 in the wave form representing the resultant difference exceeds the first order alarm set level $+1_1$, it may then happen that the integrated value difference signal obtained by comparing integrated values from counters 31 and 32 may exceed the set value of setting circuit 36.

To overcome this defect, the integrated value difference signal obtained by comparing integrated values is monitored. That is to say, an up-to-date integrated value difference signal is compared with a preceding integrated value difference signal and an alarm signal is generated only when the difference signal resulting from this comparison exceeds some fixed level.

To this end, the up-to-date integrated-value difference signal obtained from difference circuit 33 is applied to one input terminal of a second difference circuit 39 to whose other input terminal is applied the preceding integrated-value difference signal stored in a memory circuit 38. Memory circuit 38 is reset by a pulse applied thereto from reset terminal 34.

In difference circuit 39, an up-to-date integrated-value difference signal is compared with its preceding signal before the onset of the next reset pulse, and the resultant difference signal is applied to a comparator 41. In this comparator, the difference signal applied thereto is compared with a set value obtained from a setting circuit 42, and when the resultant difference signal exceeds this set value, an alarm signal is generated which appears at terminal 43.

Assuming that the flow rate differences during each predetermined interval (t) between the reset pulses are $\Delta Q_1 \Delta Q_2, \Delta Q_3 \ldots \Delta Q_n$; and that A represents the set value of setting circuit 42, an alarm signal is generated in the following situations:

$$\Delta Q_2 - \Delta Q_1 \geq A;$$

$$\Delta Q_2 - \Delta Q_1 < A, \Delta Q_3 - \Delta_2 \geq A;$$

and $$\Delta Q_n - \Delta Q_{n-1} < A, \Delta Q_{n+1} - \Delta Q_n \geq A.$$

When foreign substances adhere to the flowmeter probes for an extended period, the instantaneous difference derived from the measured outputs of the flowmeters then assumes a difference wave form which is constant for an extended period, as shown in FIG. 2B. Hence the integrated-value difference signal then obtained by integrating these measured outputs for the predetermined interval (t) is constant. This makes it feasible to discriminate between the difference condition represented by FIG. 2B and the difference condition represented by FIG. 2C in which the difference between measured outputs is not constant but increases gradually, as indicated by curve 25.

By arranging the circuit so that an alarm signal is generated when the difference signal between the up-to-date integrated-value difference signal and its preceding difference signal exceeds some fixed level A, it becomes possible to discriminate between the distinct conditions represented by FIGS. 2B and 2C.

Although in the above-described embodiment of the monitoring system, the up-to-date integrated-value difference signal is compared with its preceding signal, the same result can be obtained by using the difference signal obtained at the first measurement cycle as a reference signal so as to generate an alarm signal in the following situations:

$$\Delta Q_2 - \Delta Q_1 \geq A;$$

$$\Delta Q_2 - \Delta Q_1 < A, \Delta Q_3 - \Delta Q_1 \geq A;$$

$$\Delta Q_2 - \Delta Q_1 < A, \Delta Q_3 - \Delta Q_1 < A_1 \Delta Q_4 - \Delta Q_1 \geq A;$$

and $$\Delta Q_n - \Delta Q_1 < A, \Delta Q_{n+1} - \Delta Q_1 \geq A.$$

To this end, the instantaneous flow rate values from flowmeters 12 and 13 are respectively applied to a second set of counters 44 and 45 to produce integrated values which are applied to a third difference circuit 46 to produce an integrated-value difference signal. This integrated-value difference signal is applied to a comparator 47 which compares this signal with a set value supplied by setting circuit 4, thereby producing an alarm signal at terminal 49 when the integrated-value signal exceeds this first order alarm set level. Reset pulses periodically supplied through terminal 45 at predetermined intervals, say, every 20 minutes, are applied to counters 44 and 45 and to difference circuit 46.

In order, therefore, to judge whether or not the alarm signal appearing at output terminals 37, 43 and 49 are correct, one may sequentially monitor the signals at these terminals.

While in the above-described system the pulse output flow rate signals from flowmeters 12 and 13 are integrated by counters 31 and 32 and an integrated-value difference signal is derived from these integrated signals, it is possible to use the output obtained by integrating the instantaneous flow rate signal from difference circuit 46 for a period of fixed duration. And the same result may be attained by monitoring the difference between its up-to-date integrated value and its preceding integrated value, or the difference between the integrated value at the first measurement cycle and the integrated value in the measurement cycle which follows.

Moreover, when measuring flow rate differences in a blast furnace having a plurality of tuyeres and an equal number of monitoring points, each having an inlet and an outlet flowmeter, the output of difference circuit 46 in a FIG. 3 arrangement associated with each monitoring point may be scanned, and each output signal derived from scanning the several monitoring points may be separately stored in a suitable computer memory. These measurements are repeated, and the values obtained at every tuyere for a predetermined period. Each obtained value is compared with the preceding value stored in the memory. By using a computer, the difference between each up-to-date value and its preceding value is monitored to determine whether it exceeds some fixed set value.

Though in the embodiment disclosed herein, integration is carried out using pulse signals, it is possible to use analog signals for the same purpose.

While there have been shown and described preferred embodiments of a flow conduit monitoring system in accordance with the invention, it will be appreciated that many changes and modifications may be made therein without, however, departing from the essential spirit thereof.

I claim:

1. A system for monitoring the difference between the flow rate at the inlet and the flow rate at the outlet of a flow conduit to determine whether a disparity exists therebetween that is indicative of a leak in the conduit, said system comprising: p1 A. inlet and outlet vortex-shedding flowmeters in said conduit, each having a sensor probe to generate a pulse output signal whose frequency is a function of the rate of flow, said probes being subject to contamination giving rise to a spurious output signal;

B. means including a pulse counter coupled to each flowmeter periodically to integrate the pulse output signals thereof developed during a predetermined interval to produce an integrated-value signal;

C. means to determine the difference between the integrated-value signals of the inlet and outlet flowmeters to produce an integrated-value difference signal reflecting the existence of a disparity in the inlet and outlet flow rates, and D. means to compare the integrated-value difference signal with a set value to produce an alarm signal when the difference signal exceeds said set value.

2. A system as set forth in claim 1, wherein said means to determine the difference between the integrated-values is constituted by a difference circuit coupled to said counters.

3. A system as set forth in claim 2, further including means to apply periodic reset pulses to said counters and to said difference circuit at the end of each interval.

4. A system as set forth in claim 3, further including a memory coupled to said difference circuit to store a preceding integrated-value difference signal, and means coupled to said memory to compare said preceding signal with an up-to-date integrated-value difference signal to produce a difference signal representing the difference therebetween.

5. A system as set forth in claim 4, wherein said comparison means is constituted by a comparator coupled to said memory to compare the difference signal resulting from the difference between the preceding and the up-to-date signal with a set value to produce an alarm signal when this difference signal exceeds the set value.

* * * * *

UNITED STATES PATENT OFFICE
CERTIFICATE OF CORRECTION

Patent No. 4,090,179  Dated May 16, 1978

Inventor(s) Toru Hirano

It is certified that error appears in the above-identified patent and that said Letters Patent are hereby corrected as shown below:

Column 1, line 56 after "analog" -- output -- should have been inserted

Column 4, line 30 after "set" --value-- should have been inserted

Claim 1 delete "pl"

Signed and Sealed this

Seventeenth Day of October 1978

[SEAL]

Attest:

RUTH C. MASON
Attesting Officer

DONALD W. BANNER
Commissioner of Patents and Trademarks